United States Patent [19]

Zijlstra et al.

[11] 4,091,951
[45] May 30, 1978

[54] LAMPS FOR HIGH POWERS

[75] Inventors: Anthonie Louis Zijlstra; Anton Boekkooi, both of Eindhoven, Netherlands

[73] Assignee: U.S. Philips Corporation, New York, N.Y.

[21] Appl. No.: 745,478

[22] Filed: Nov. 26, 1976

[30] Foreign Application Priority Data

Dec. 15, 1975 Netherlands .......................... 7514565

[51] Int. Cl.² ............................................. H01J 61/30
[52] U.S. Cl. .................................. 220/2.1 R; 65/30 E; 106/52; 106/53; 313/221; 313/317; 428/218; 428/410
[58] Field of Search ......................... 313/221, 317, 222; 65/30 E; 106/52; 220/2.1 R, 2.1 A; 428/410

[56] References Cited

U.S. PATENT DOCUMENTS

| 3,498,773 | 3/1970 | Grubb et al. | 428/410 |
| 3,723,790 | 3/1973 | Dumbaugh et al. | 106/52 |
| 3,730,871 | 5/1973 | Boffe | 65/30 |
| 3,764,840 | 10/1973 | Shiraishi | 313/221 |
| 3,844,754 | 10/1974 | Grubb et al. | 65/30 |
| 3,875,763 | 4/1975 | Snyder et al. | 65/30 E |
| 3,930,820 | 1/1976 | Cooke et al. | 65/30 E |

FOREIGN PATENT DOCUMENTS

| 47-4191 | 2/1972 | Japan | 65/30 E |
| 917,388 | 2/1963 | United Kingdom. | |

Primary Examiner—Helen M. McCarthy
Attorney, Agent, or Firm—Frank R. Trifari; Robert S. Smith

[57] ABSTRACT

A lamp, particularly for high powers, whose envelope consists of lime glass and in which in a 30μ thick surface layer $Na^+$ - and/or $Li^+$ ions are replaced by larger ions. This results in a compressive stress in the layer which is at least 7 kg/mm². The envelope is as strong and resistant to temperature changes as hard glass.

1 Claim, 1 Drawing Figure

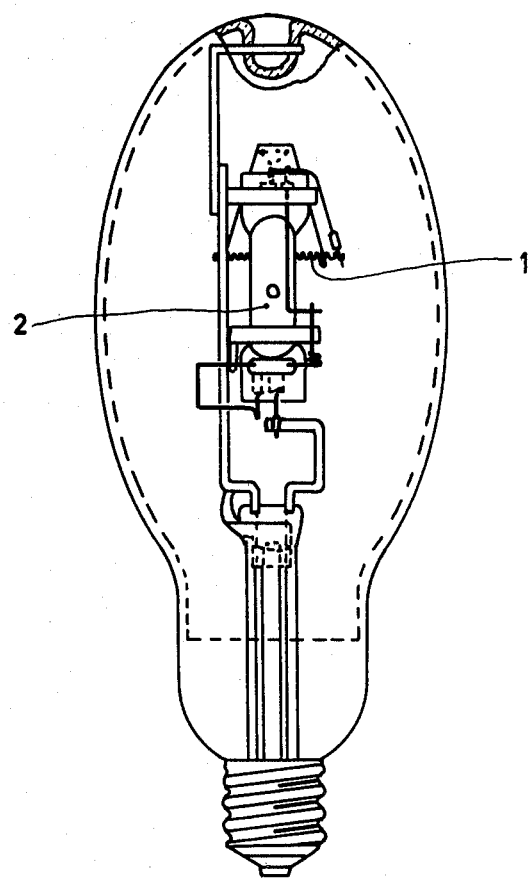

LAMPS FOR HIGH POWERS

The invention relates to incandescent lamps and discharge lamps, in particular to such lamps the bulb wall temperature of which becomes very high during operation i.e., 200° to 400° C.

Up to now envelopes for this kind of lamps consisted of hard glass, borosilicate glass in particular, because these envelopes have a low coefficient of expansion which makes the lamps highly resistent against temperature shocks, for example owing to raindrops. Furthermore, hard glass is highly resistant against weathering under the influence of the atmosphere.

A drawback of hard glass is its rather high price and the necessity to use tungsten or molybdenum for the relevant feedthrough metals.

It is an object of the invention to provide a construction with a considerably cheaper envelope which yet satisfies the thermal requirements and which may be provided with cheap feedthrough metals such as, for example, nickel iron or copper clad-wire (dumet).

According to the invention the evelope consists of a kind of glass which is within the following range of compositions in weight %:

$SiO_2$ 65 – 85
$Al_2O_3$ 0 – 3
$Na_2O$ 5 – 20
$K_2O$ 0 – 2
$B_2O_3$ 0 – 1
$CaO$ 5 – 15
$MgO$ 0 – 5
$BaO$ 0 – 5
$Sb_2O_3 + As_2O_3$ 0 – 1,5
$SO_3$ 0 – 1.

where $Na_2O$ may be wholly or partly replaced equimolarly by $Li_2O$ and where the total of contaminations $(Fe_2O_3)$ + coloured oxides is $\leq 2$, the surface of the envelope having for a preponderating part a layer at least 30 μm thick in which $Na^+$- and/or $Li^+$-ions have been replaced by larger ions in such a proportion that there is a maximum compressive stress in the layer which amounts to at least 2,000 μm/cm that is to say to approximately 7 kg/mm².

The range of glass compositions described above comprises the glasses which are indicated in daily use as "lime glasses". These glasses are easy to melt and to refine. It is rather difficult to melt borosilicate glasses in such a way that faultless products without cords, stones and bubbles are obtained. In practice lime glass products can therefore be obtained at considerably lower prices than products from borosilicate glasses.

A very important advantage of the construction according to the invention is that, instead of expensive feedthrough metals such as molybdenum or tungsten cheap feedthrough metals which are also much easier to process can be used, particularly cooper-clad wire. At the same time a much cheaper glass may be used for the lamp base: instead of tube glass of borosilicate glass a lead glass with, for example, 20 or 30% PbO.

An area in the glass surface in which $Na^+$- and/or $Li^+$-ions may be replaced by larger ions can be obtained in known manner by processing the relevant glass object in a molten potassium salt, silver salt or sodium salt, for example potassium nitrate to which possibly potassium carbonate is added or other materials which keep the bath active during use. Such a procedure is known from inter alia British Patent Specification 917,388 and Dutch Applications 6,800,914, 6,913,966 and 7,101,388 which have been laid open to public inspection.

It is known to strengthen all kinds of glass objects in the above described manner by replacement.

However, hitherto envelopes for lamps have not been strengthened in this manner before processing them into a lamp. For this various sealing-in and sealing-to operations must be performed and one would expect that, as a result of this sealing treatment at a high temperature the strengthening effect of the ion exchange would be neutralised owing to relaxation of the compressive stresses built up. It was surprisingly found that this indeed occurs to a slight degree locally at the surface of the envelope but the total effect after assembly of the lamp even appears to be such that the resistance of the lamp according to the invention against temperature changes is still considerably better than that of the known lamp with hard glass envelope.

By way of example the description of the production of a bulb for a 250 W high-pressure mercury discharge lamp is given herebelow:

Lime glass bulbs of the following composition in weight %:

$SiO_2$ — 68.0
$Na_2O$ — 16.8
$K_2O$ — 1.0
$CaO$ — 5.7
$BaO$ — 2.0
$MgO$ — 3.9
$Al_2O_3$ — 2.6.

were kept immersed in a molten $KNO_3$ bath as described in Dutch Patent Application 6,800,914, which has been laid open to public inspection.

One part was kept for 21 hours in a 400° C bath, air being passed through this bath. Another part was kept for 60 minutes in a bath which was heated to 500° C. The first-mentioned bulbs had a stresses layer of 40 μm on an average. The maximum compressive stress obtained is 6400 nm/cm corresponding to approximately 21 kg/mm². The maximum compressive stress was at the surface. The last-mentioned bulbs were provided with an exchanged layer which was approximately 35 μm thick. The compressive stress built up was 5000 nm/cm at a maximum, that is to say 16 kg/mm² and this maximum compressive stress was found at a depth of 10 to 15 μm.

Lamps, namely the current types MLHP 250 W and MLL 250W were made of the reinforced bulbs; a drawing of the latter is added hereto. The bulb has a length of 190 mm and a greatest diameter of 90 mm. This type has a filament 1 and a discharge vessel 2 filled with mercury. Lamps with strengthened envelopes, together with a few specimens of the same type with a traditional hard-glass bulb, consisting of a borosilicate glass having a coefficient of thermal expansion which is compatible with that of tungsten, were subjected to a drip test.

The drip test consist in that drops of ice water are dropped from a height of 15 cms with a frequency of 50 to 60 drops per minute on the horizontal, burning lamp on the area of the envelope having the largest diameter. Every 30 drops the dripping is interrupted for, for example, 20 minutes. Lamps which had been evacuated cold as well as lamps which had been evacuated warm withstood at least six of these cycles, both before and after 1000 operating hours, the same as lamps with hard glass bulbs.

Lamps produced of non-strengthened soft glass bulbs did not even withstand one cycle of this dripping test.

It appeared that the results of strengthening which was only performed externally and of strengthening which was effected both internally and externally were substantially equal.

What is claimed is:

1. A lamp characterized in that the envelope, consists of glass the composition of which lies within the range in weight % which is limited as follows:

$SiO_2$ — 65–85
$Al_2O_3$ — 0–3
$Na_2O$ — 5–20
$K_2O$ — 0–2
$B_2O_3$ — 0–1
$CaO$ — 5–15
$MgO$ — 0–5
$BaO$ — 0–5
$Sb_2O_3 + As_2O_3$ — 0–1,5
$SO_3$ — 0–1.

where $Na_2O$ may be wholly or partly replaced equimolarly by $Li_2O$ and where the total of contaminations and coloured oxides is $\leq 2$, which envelope has for a preponderating part at the surface a layer of at least 30 μm thick in which $Na^+$- and/or $Li^+$-ions are replaced by larger ions in such a proportion that in the layer there is a compressive stress which is at least 2000 nm/cm = approximately 7 kg/mm².

* * * * *